No. 736,008. Patented August 11, 1903.

UNITED STATES PATENT OFFICE.

CARL V. PETRAEUS, OF IOLA, KANSAS.

TREATMENT OF ZINC ORES.

SPECIFICATION forming part of Letters Patent No. 736,008, dated August 11, 1903.

Application filed November 19, 1901. Serial No. 82,864. (No specimens.)

*To all whom it may concern:*

Be it known that I, CARL V. PETRAEUS, a citizen of the United States of America, residing in Iola, in the county of Allen, in the State of Kansas, have invented a certain new and useful Improvement in Treatment of Zinc Ores, of which the following is a true and exact description.

My invention relates to the treatment of zinc ores, and has for its object the securing of the zinc contents of such ores in commercially-valuable forms and with economy and completeness.

The first steps of my method are those in common use for the treatment of zinc ores in retort-furnaces, the zinc ore being mixed with carbon and charged into retort-furnaces, where the zinc is partly reduced and volatilized, the metallic zinc being caught in condensers, the residuum remaining in the retorts, containing considerable zinc in admixture, with a large quantity of coke. In this treatment a considerable amount of zinc escapes from the furnaces and condensers, and this I secure by screening the gases escaping from the retorts and condensers, so as to intercept all the solid matter therein, which intercepted solid matter I then mix with the carbonaceous and metal-bearing residue of the retorts. I then charge the mixture into compound reducing and oxidizing furnaces, where the carbon is ignited by a blast of air and the zinc contained in the mixture driven off as a fume, chiefly of zinc oxid. Finally, I screen the furnace-gases in order to recover this fume, which, as taken from the screen system, is a valuable commercial product.

I would also state that, while the residues from the retort-furnaces often contain valuable metals other than zinc, such residues are in such physical condition as not to be readily smelted, while, after treatment in the compound oxidizing and reducing furnaces, not only is the zinc in these residues driven off and recovered, as above stated, but the residual material left in the furnace is densified and brought to a suitable condition for smelting and the recovery of the valuable metals contained in it. This treatment, however, forms the subject-matter of my other application for Letters Patent, filed November 19, 1901, Serial No. 82,865.

Having now described my invention, what I claim as new, and desire to secure by Letters Patent, is—

The method of treating zinc ores, which consists in mixing such ores with carbon, subjecting the mixture to high heat with exclusion of air, in order to reduce and distil a large portion of the zinc, condensing the distilled metal, recovering the zinc-fumes which escape from the distilling and condensing apparatus, mixing said fumes with the carbonaceous and metal-bearing residue of the distilling process, treating said mixture to reduce and oxidize the metals in order to drive off its metallic contents as a fume, and recovering said fume by screening the furnace-gases.

CARL V. PETRAEUS.

Witnesses:
EDW. C. REGUS,
D. STEWART.